United States Patent [19]

Sembely

[11] Patent Number: 5,363,148
[45] Date of Patent: Nov. 8, 1994

[54] CRT DISPLAY SET AND OPTICAL DEVICE HAVING MEANS FOR ACCURATELY POSITIONING THE CRT

[75] Inventor: Jean-Pierre Sembely, St Egreve, France

[73] Assignee: Thomson Tubes Electroniques, Velizy, France

[21] Appl. No.: 992,251

[22] Filed: Dec. 14, 1992

[30] Foreign Application Priority Data

Dec. 31, 1991 [FR] France ................... 91 16378

[51] Int. Cl.⁵ .............. H04N 5/645; H04N 5/74; H01J 29/24; H01J 29/89
[52] U.S. Cl. .................. 348/781; 348/785; 348/825; 348/832; 313/474; 313/476; 313/478; 313/482
[58] Field of Search ............. 358/245, 247, 248, 249, 358/250, 254, 231, 237; 313/482, 478, 474, 476; 220/2.1 A, 2.3 A; 348/781, 785, 832, 825

[56] References Cited

U.S. PATENT DOCUMENTS

| | | | |
|---|---|---|---|
| 2,545,348 | 3/1951 | Fabel | 348/825 |
| 2,559,353 | 7/1951 | Fisch | 348/825 |
| 2,663,011 | 12/1953 | DeBoy | 348/825 |
| 4,522,309 | 6/1985 | Overall et al. | 220/2.1 A |
| 4,621,294 | 11/1986 | Lee | 358/237 |
| 4,716,493 | 12/1987 | Zelkowitz | 348/825 |

*Primary Examiner*—Scott A. Rogers
*Attorney, Agent, or Firm*—Meltzer, Lippe, Goldstein, Wolf, Schlissel & Sazer

[57] ABSTRACT

The disclosure relates to display sets wherein the image produced by a cathode-ray tube is displayed on a display screen by means of an optical device. It relates more particularly to means for facilitating the relative positioning between the cathode-ray tube and the optical device. The cathode-ray tube comprises a bulb having one end closed by a transparent plate bearing an cathodoluminescent screen. In one characteristic, the transparent plate is greater than the bulb and comprises a peripheral part that extends beyond the bulb so as to constitute a reference marker of the position of the cathodoluminescent screen. FIG. 1.

9 Claims, 2 Drawing Sheets

CRT DISPLAY SET AND OPTICAL DEVICE HAVING MEANS FOR ACCURATELY POSITIONING THE CRT

BACKGROUND OF THE INVENTION

1. Field of the Invention

The invention relates to image display sets in which the image produced by a cathode-ray tube is conveyed by means of an optical device to be displayed on a display screen. The invention relates more particularly to means to achieve the relative positioning between the cathode-ray tube and the optical device.

Among display sets requiring means of this kind to obtain positioning between the cathode-ray tube and the optical device, we might cite for example:
—television image projectors;
—electronic visor devices in military aircraft;
—landing-assistance devices in civilian and military aircraft.

In all these devices, the light carrying the image produced by the cathodoluminescent screen of the cathode-ray tube is picked up by the lens or lenses of an optical device, and then reflected by mirrors to be projected on a display screen. To preserve the qualities of the image produced by the cathode-ray tube, it is necessary to achieve accurate optical coupling between this tube and the optical device. This necessitates a perfect definition of the plane of the image (inside the cathode-ray tube) with respect to mechanical references that are used for the assembly.

2. Description of the Prior Art

A cathode-ray tube (CRT), incorporated in a display set of the type defined here above, constitutes an electronic component with a lifetime that may be shorter than that of the set in which it is mounted, and it should therefore be be easily replaced. To this end, the CRTs thus used are always positioned in a mounting shell or case, made of metal, having high-precision mechanical reference bearing surfaces. These mechanical reference bearing surfaces constitute mechanical references which, when the CRT and the optical device are being joined, taking the optical characteristics of the optical device into account, enable the position of this optical device to be defined with respect to the position of the plane of the image.

The plane of the image corresponds to the apparent plane of the luminophor, namely to the apparent plane of the cathodoluminescent screen. In a monochromatic CRT for example, the cathodoluminescent screen is foraged by a layer of luminophors. The layer of luminophors is generally deposited on an internal face of a transparent glass plate which closes a bulb with which it constitutes the vacuum-tight chamber of the CRT.

It must be noted that the image plane or apparent plane of the luminophor is different from the plane of the internal face of the plate, for the "optical thickness" $Eo$ of the plate is related to its real thickness $Er$ by the relationship $Eo=Er/n$, n being the refractive index of the glass forming the plate. Consequently, the image plane is located slightly before the internal face, inside the plate. Since the real thickness of the plate is known, the position of the image plane may be defined from the external face of the plate, and reference markers of this position may be put on the metal mounting case containing the CRT, these reference markers being constituted by the above-mentioned mechanical reference bearing surfaces.

In the case of a circular CRT, the mechanical reference bearing surfaces forming reference markers are often constituted, for example, by a cylindrical collar, plus a pin or a hole for the angular reference marking. In the case of a rectangular CRT, these mechanical reference bearing surfaces may be more complicated, and three fastening lugs may be necessary.

The CRT should therefore be fixed in a well-defined position in the metal mounting case. This is a position in which the CRT is held by resins that are poured or injected between the interior of this case and itself. This constitutes a relatively delicate coating operation which requires complex tools that should notably fulfil the functions of impervious sealing, holding the elements together, positioning the image plane with respect to the mechanical reference bearing surfaces and the observation, on the CRT screen, of the action of the deflection means which should be housed in the mounting case and around the CRT.

It is often observed, notably because of the varyingly dissymmetrical thrust forces that may be exerted at the time of the polymerization of the injected resins, that there are small differences in the position of the image plane, after the joining of the CRT and the mounting case.

The present invention relates to a display set of the kind defined here above, and its object is to reduce or even eliminate certain of the drawbacks related to the referencing of the position of the image plane and to the positioning of the optical device with respect to this image plane.

SUMMARY OF THE INVENTION

The invention therefore relates to a display set comprising a cathode-ray tube and an optical device, the cathode-ray tube comprising a bulb, a front end of which is closed by a plate, the plate bearing a cathodoluminescent screen on an internal face, the display set further comprising a mechanical reference surface and means for the reference marking of the position of the cathodoluminescent screen, wherein the plate is greater than the section of the bulb and comprises a peripheral part extending beyond the bulb so as to constitute a reference marker of the position of the cathodoluminescent screen.

BRIEF DESCRIPTION OF THE DRAWINGS

The invention will be understood more clearly from the following description, made with reference to the appended drawings, of which.

DETAILED DESCRIPTION OF THE INVENTION

Figure 1:
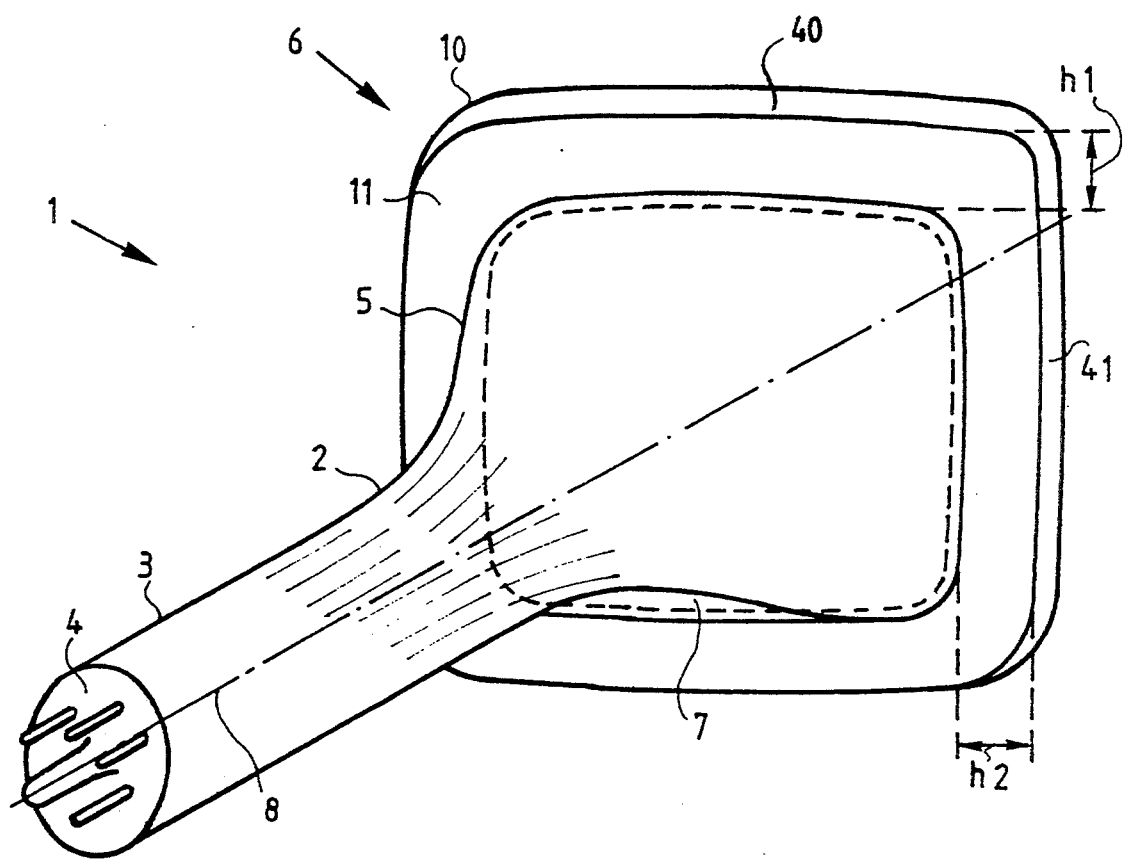
FIG. 1 is a view in perspective giving a schematic view of a cathode-ray tube designed to be incorporated into a display set according to the invention.

FIG. 1 shows a cathode-ray tube 1 or CRT made according to the invention.

The CRT 1 comprises a bulb 2, which is a standard element per se. This bulb 2 has its rear end 3, which is designed to house the electron gun (not shown), closed by a connecting base 4 and its front end 5, which is widened, closed by a transparent plate 6.

A cathodoluminescent screen 7 (represented by dashes) or luminophor layer is made on the internal face of the plate 6. The cathodoluminescent screen 7 is centered on a longitudinal axis 8 of the CRT, and its surface area is slightly smaller than the section of the front 5 of the bulb 2.

According to one characteristic of the invention, the plate 6 is bigger than the section of the bulb 2, so that it extends beyond this bulb, at least on a part of the rim of this bulb.

The plate 6 thus has a peripheral part 10 that extends beyond the bulb 2. In the non-restrictive example described, this peripheral part is distributed symmetrically with respect to the bulb, namely with respect to the longitudinal axis 8.

Since the deposition of the layer of luminophors 7 or cathodoluminescent screen is made on an internal face 11 of the plate 6, this internal face 11 itself extends beyond the bulb 2. This internal face 11 is therefore accessible, and it may constitute a mechanical reference marker that is directly available outside the CRT, to identify or indicate the position of the plane containing the cathodoluminescent screen 7.

Thus, very precise mechanical reference markers are obtained at low cost and in a simple manner. All that needs to be done is to use a plane optical glass plate having dimensions that are substantially greater than those of the bulb 2 and that is sealed to this bulb 2 in a manner that is standard per se, by means of a sintered glass compound for example.

In the example shown, the CRT is a tube with a rectangular screen but, naturally, the invention can equally well be applied to a tube with a circular screen. All that has to be done is to provide the plate that bears the screen with dimensions that are appreciably greater than those of the bulb 2.

It must be noted that the edge of the plate 6 may constitute reference markers for the crosswise positioning of the CRT, notably on two sides 40, 41 for which the height h1, h2 by which they extend beyond the bulb 2 is known.

Figure 2:
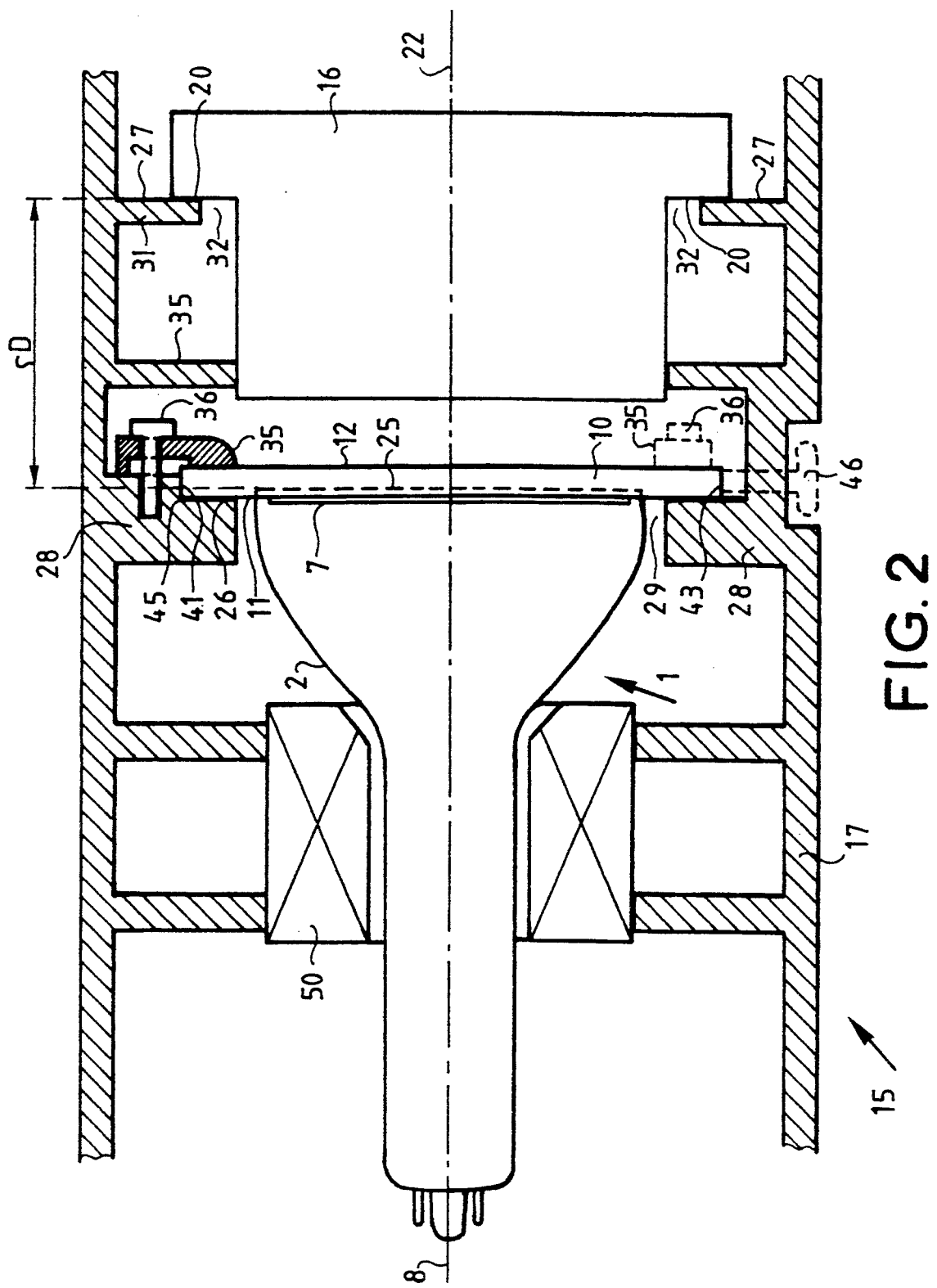
FIG. 2 shows a schematic sectional view of a preferred embodiment of a display set according to the invention, in which the cathode-ray tube shown in FIG. 1 is mounted.

FIG. 2 shows a schematic view of a display set 15 in which the CRT of FIG. 1 is coupled to an optical device 16 according to a preferred embodiment of the invention.

The display set 15 has a mechanical assembly or frame 17 to which the CRT 1 and the optical device 16 are fixed.

The optical device 16 is a standard device per se. Its function is to pick up the luminous image produced by the CRT 1 in order to project this image on a display screen (not shown). To simplify the description, the optical device 16 is symbolized in FIG. 2 by a block, but it may comprise several lenses (not shown) prepositioned with respect to one another and with respect to a mechanical reference bearing surface 20 of the optical device, in such a way that it is enough to position the CRT 1 accurately with respect to this mechanical reference bearing surface 20.

The CRT 1 and the optical device 16 are mounted in the frame 17 so that, firstly, they face each other and the longitudinal axis 8 of the CRT is merged with an optical axis 22 of the optical device and, secondly, the image plane or apparent plane 25 (symbolized by a line of dashes) is very precisely at a predetermined distance D from the mechanical reference bearing surface 20 of the optical device 16.

To this end, the frame 17 comprises first and second reference surfaces 26, 27 located in planes that are parallel to each other and perpendicular to the longitudinal axis 8, and are designed respectively for the positioning of the CRT 1 and the positioning of the optical device 16.

In the example shown, the first reference surface 6 is constituted by means of a wall 28 having an aperture 29 in its central part.

The bulb 2 of the CRT is engaged in the aperture 29 and the peripheral part 10 of the plate 6 is made to abut the wall 28, on a face 26 of this wall 28 that is oriented towards the optical device 16, said face 26 forming the first reference surface. Consequently, in the example shown, it is the internal face 11 of the peripheral part 10 and hence of the plate 6 that is used as a reference.

The internal face 11 bears the cathodoluminescent screen 7, the apparent plane or image plane 25 of which is formed inside the plate 6 as has been explained here above.

Since the refractive index n of the plate 6 is known, as also its real thickness Er, its optical thickness Eo as well as the difference in position between the image plane 25 and the reference surface 26 is deduced therefrom.

This difference in position is taken into account to place the second reference surface 27 at the distance D from the first reference surface 26, this distance D being suited to achieving accurate coupling between the CRT and the optical device 16.

The second reference surface 27 may be constituted, for example, by a face of a second wall 31 on which the mechanical reference bearing surfaces are supported. In the example, the second wall 31 has an aperture 32 in its central part to let the optical device pass through. In the non-restrictive example shown, the frame 17 has a second wall 35 cooperating with the second wall 31 for the fastening of the optical device 16. The third wall is provided with a central aperture in which the optical device 16 is engaged, the position of this central aperture determining the transversal position of the device 16.

The CRT 1 can be fixed in the frame by the fixed joining of the peripheral part 10 of the plate 6 with the first reference surface This can be done in different ways, for example by means of screws (not shown) going through the peripheral part 10, to be screwed into the thickness of the first wall 28, for example one screw at each corner in the case of a rectangular CRT. However this calls for making holes for the passage of screws into the peripheral part of the plate 6. This, in the case of glass, is a more difficult (and hence a costlier) operation than the machining of the faces and of the edges of the plate.

Furthermore, glass is a material that is strong enough to stand up to a mechanical pressing force (it withstands compressive strains very well). It is therefore preferable fix the plate 6 to the frame without making holes in it.

This can be done, for example, as is shown in FIG. 2, by means of U-shaped fastening lugs 35 which are tightly secured by screws 36 to the first wall 28 and which, at the same time, lean on the external face 12 of the plate 6, in the peripheral part 10 of this plate. The plate 6 can thus be held pressed against the first reference surface 26 by means of several fastening lugs 35 such as those shown at the top of FIG. 2, these fastening lugs being possible distributed on the rim of the peripheral part 10.

The correct transversal position of the CRT 1 can be defined by using the edge of the plate 6 on the sides 40, 41 of this plate, for example to constitute transversal reference markers relating to the center of the cathodoluminescent screen 7, namely the position of the longitudinal axis 8 of the CRT. To this end, it is enough to know the heights h1, h2 (shown in FIG. 1) by which the sides 40, 41 go beyond the bulb, and to make mechanical stop elements in the frame that take account of these heights h1, h2 so that the longitudinal axis 8 and the optical axis 22 are on a same axis.

These mechanical stop elements may consist, for example, of shoulders made in the first wall 28, as represented in FIG. 2 by a shoulder 45 against which the side 41 of the plate 6 is made to abut. To this end, the frame 17 may have thrustor element 46 which pushes the plate 6 and hence the CRT so that they abut the shoulder 45, in acting on a side 43 of the plate 6, opposite the one constituting the crosswise reference marker 40. The thrustor element 46 may be a screw for example, preferably made of a soft material (plastic, hard rubber etc.). In the example shown in FIG. 2, the side 42 constituting a second transversal reference marker is in a shallower plane than that of FIG. 2, and it is therefore not shown.

With the invention, it is no longer necessary to place the CRT in a case or shell, whether for its positioning or for its protection, both magnetic and mechanical, for these two types of protection can be provided by the frame 17 itself. This frame 17 may indeed be made, at least in its part surrounding the CRT, of a material suitable for forming a magnetic shielding.

This results in an additional advantage, which relates to the fact that the deflection elements 50 needed for the working of the CRT are of course positioned around the bulb 2, but that these deflection means can easily be separated from the CRT whereas, in the prior art, they are buried in the resin around the CRT. Consequently, these deflection means 50 can be made independent of the CRT. Should the CRT be replaced, they can be kept in the frame 17.

The invention can be applied advantageously in every case where the position of the image plane has to be known. It constitutes a simple approach that is easy to implement and greatly improves the precision of the positioning while, at the same time, being a low cost approach. It is indeed easy and relatively inexpensive to procure supplies of glass plates that have a thickness of a few millimeters for example, with a tolerance of the order of ±0.04 mm, and with the faces being mutually parallel to a very precise degree.

It must be noted that, in the example described with reference to FIG. 2, the first reference surface 26 on which the plate 6 rests receives the internal surface 11 of this plate, but this first reference surface can equally well be formed and oriented to receive the external face 12 of the plate 6. It is enough to take account thereof in determining the distance D between the two reference surfaces.

What is claimed is:

1. A display set comprising a cathode ray tube and an optical device, the cathode ray tube comprising a bulb, a front-end of which is closed by a transparent plate, the transparent plate having a rear face bearing a cathodoluminescent screen, the display set further comprising means for holding the optical device, and a mechanical reference surface, wherein the transparent plate has a central portion extending within the periphery of the bulb at the front-end thereof and a peripheral portion extending beyond a periphery of the bulb at the front-end thereof, and wherein the rear face of the transparent plate at the peripheral portion thereof is in direct contact with said mechanical reference surface for a precise positioning of the cathodoluminescent screen with respect to the optical device.

2. A display set according to claim 1, comprising a frame in which there are fixed the cathode-ray tube and the optical device, wherein at least one of the two large faces of the transparent plate cooperates with a reference surface to define the position of the cathode-ray tube with respect to the optical device.

3. A display set according to claim 2 wherein, on at least one side of the transparent plate, the peripheral part goes beyond the bulb by a determined height so that the edge constitutes a transversal positioning reference marker cooperating with a mechanical stop element of the frame to position a longitudinal axis of the cathode-ray tube with respect to an optical axis of the optical device.

4. A display set according to claim 3, comprising a thrustor element working on the edge of the transparent plate opposite the mechanical stop element.

5. A display set according to claim 1 comprising electromagnetic deflection means, wherein the deflection means can be separated from the cathode-ray tube.

6. A display set according to claim 2 wherein the frame constitutes a shield against magnetic fields.

7. A cathode-ray tube for image projection, comprising a bulb having a front-end and a transparent plate for closing said front-end, said front-end having a periphery and said transparent plate having a first central portion extending within the periphery of said front-end, and a second, peripheral portion extending beyond the periphery of said front-end, said transparent plate having a rear face and a front face, said rear face having an internal portion within said bulb, said internal portion covered with a cathodoluminescent screen, and an external portion extending outside the bulb on the peripheral portion of said transparent plate, said external portion of the rear face of the plate being freely accessible for constituting a reference marker of the portion of the cathodoluminescent screen inside the bulb.

8. A display set comprising a cathode ray-tube and an optical device, the cathode ray tube comprising a bulb, a front-end of which is closed by a transparent plate, the transparent plate having a front face and having a rear face bearing a cathodoluminescent screen, the transparent plate being greater than the section of the bulb so as to constitute a reference marker of the position of the cathodoluminescent screen, the display set further comprising a frame in which there are fixed the cathode ray-tube and the optical device, said frame having a mechanical reference surface, wherein at least one of the front and rear faces of the transparent plate cooperates with said reference surface to define the position of the cathode ray tube with respect to the optical device.

9. The display set of claim 8, wherein, on at least one side of said transparent plate, the peripheral part goes beyond the bulb by a determined height so that the edge constitutes a transversal positioning marker cooperating with a mechanical stop element of the frame to position a longitudinal axis of the cathode ray-tube with respect to an optical axis of the optical device.

* * * * *